United States Patent [19]

Diana

[11] 4,337,565
[45] Jul. 6, 1982

[54] DISPOSABLE COOKING UTENSILS

[76] Inventor: Michael Diana, 501 Cleveland Ave., SW., Largo, Fla. 33540

[21] Appl. No.: 128,534

[22] Filed: Mar. 10, 1980

[51] Int. Cl.³ .................. B21D 39/00; B23P 11/00
[52] U.S. Cl. ............................. 29/509; 220/67;
220/85 H; 220/95; 229/3.5 MF; 99/319; 413/1
[58] Field of Search ........ 29/509; 113/120 V, 120 G,
113/120 CC; 99/319; 229/3.5 MF; 220/95, 85
R, 67, 85 H, 81 R, 84; 413/1

[56] References Cited
U.S. PATENT DOCUMENTS

| | | | |
|---|---|---|---|
| 2,174,425 | 9/1939 | Schlumbohm | 113/120 CC UX |
| 2,791,350 | 5/1957 | Mennen | 220/95 X |
| 3,082,906 | 3/1963 | Reed | 220/95 |
| 3,140,034 | 7/1964 | Wyman et al. | 229/3.5 MF |
| 3,856,176 | 12/1974 | Carter | 220/95 X |

Primary Examiner—Charlie T. Moon
Attorney, Agent, or Firm—Ronald E. Smith

[57] ABSTRACT

A method for hand forming cooking utensils, a portion of the formed utensil being disposable.

A wire frame is bent to define the shape, in plan view, of the desired cooking utensil. To form a two-dimensional cooking utensil, a foil means is wrappingly secured to the wire frame. To form a three-dimensional cooking utensil, the wire means is first deformed to conform to the perimetrical configuration of a mold means which is preferably a staple item of commerce such as a mayonnaise jar or a number 10 can. After removing the wire member from its surrounding engagement with the mold member, a foil means is manually made to conform to the shape of the mold means. The wire member is re-positioned about the perimeter of the mold means, spaced downwardly from the upstanding free end of the mold means, assuming such mold means is supported on one of its ends by a support surface, a predetermined distance equal to the depth of the desired cooking utensil. Securing the foil means about the periphery of the wire frame by reversely folding the foil and crimping the same provides the desired utensil when the frame and mold are separated. Handle means are integrally formed with the mold encircling-portion of the wire frame.

2 Claims, 13 Drawing Figures

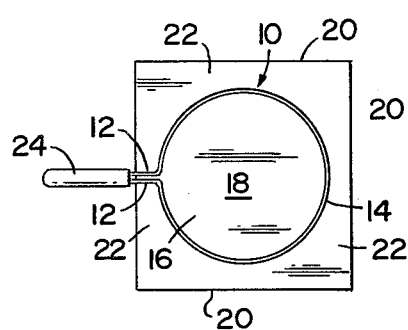
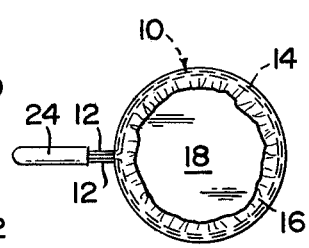
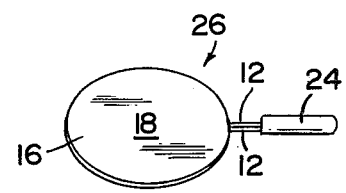
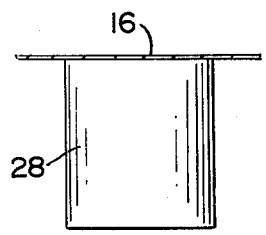
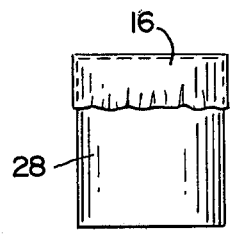
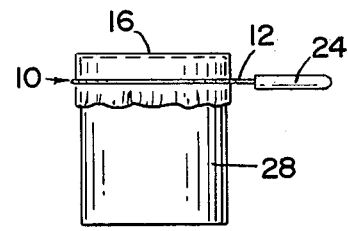
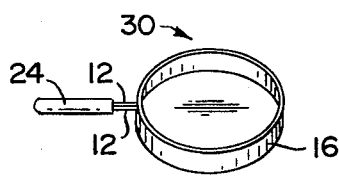
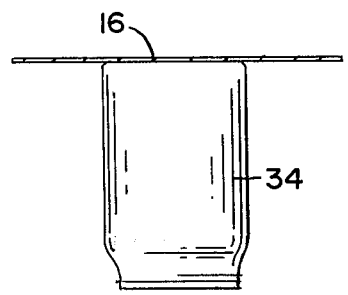
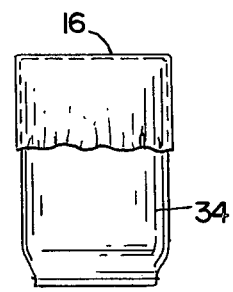
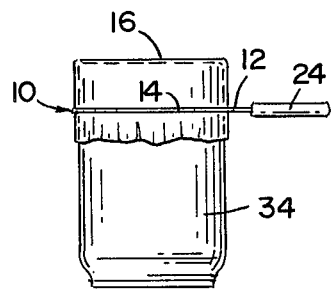
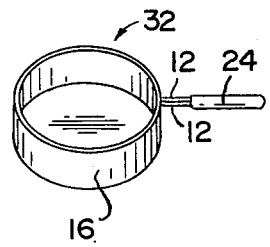
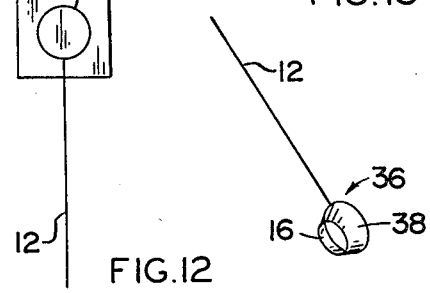
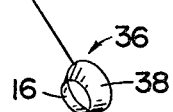

DISPOSABLE COOKING UTENSILS

BACKGROUND OF THE INVENTION

1. Field of the Invention

This invention relates generally to methods for making cooking utensils, more particularly to methods for hand forming cooking utensils and specifically to such methods for hand forming cooking utensils having a disposable working portion and a non-disposable handle and frame portion.

2. Description of the Prior Art

A search found the following U.S. Patents containing disclosures of cooking utensils: D198,097; U.S. Pat. Nos. 2,791,350; 3,078,787; 3,194,429; 3,381,851; 3,782,976; 4,026,435. None of these patents are directed to methods of, nor do any of the patents suggest, a method for hand forming the utensils from readily available parts.

Single persons often have no desire to purchase expensive, permanent cooking ware. Nor do campers desire to take their good cookware to the campsite with them. A need therefore exists not only for cookware of inexpensive yet durable construction, but indeed for a method that would enable single persons, campers or the like to make their own cooking utensils. The ideal cooking utensil would never need washing, since its working portion could be disposable. The frame of the ideal utensil would be easy to store and would require a minimum amount of space. Further, the molds for forming certain utensils should be readily available to the average apartment dweller or camper.

Such an ideal cooking utensil does not appear in the earlier patent literature.

SUMMARY OF THE INVENTION

In fulfillment of the longstanding but unfulfilled need for a method whereby partially disposable cookware could be hand formed from commercially available materials, the invention provides a method wherein such utensils can be formed by hand from such items as aluminum foil, coat hangers, wooden pegs, mayonnaise jars and number 10 cans.

A wire member, which can be supplied by a coat hanger, is bent around a mayonnaise jar or a number 10 can or other circular object to form a frame to which heavy duty aluminum foil is secured. The opposing ends of the wire member are preferably formed into a handle means and covered with a wooden covering to reduce the transfer of heat to the hand during the cooking operation. Of course, the wooden covering can be omitted if the user of the invention prefers to manipulate the handle means while using other such protective covers such as pot holders and the like.

A frame alone can provide two dimensional utensils such as griddles when the foil means is crimpingly engaged about the periphery of the frame so that the major portion of the foil provides a web means intermediate of the frame portion. A jar or can is normally needed if a three dimensional utensil such as a frying pan is sought to be hand formed. The frame is prepared by first bending it around the can or jar to be used as a mold. The foil is then conformed to the shape of the can or jar and the wire member is moved relative to the jar or can having foil in overlying and conforming relationship thereto and therewith so that such jar or can protrudes through the substantially circular loop defined by the wire member. The amount of protrusion determines the depth of the desired pan, since such pan is formed by versely folding the foil overlying the mold and crimping the same to engage different areas of the wire loop member. Separating the wire member/foil assembly from the mold, i.e., from the jar or can, produces the desired utensil.

It is therefore seen an important object of this invention to provide a method for hand forming cooking utensils from staple items of commerce.

Another object of this invention is to provide such a method that produces cooking utensils having a disposable working portion and a retainable frame portion.

Another object is to provide such methods whereby either two dimensional or three dimensional cooking utensils can be produced.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a bottom plan view showing the inventive frame disposed in overlying relation to a flexible sheet material such as aluminum foil.

FIG. 2 is a bottom plan view showing the foil means of FIG. 1 wrapped about the periphery of the inventive frame, said frame shown in phantom lines.

FIG. 3 is a diagrammatic perspective view of the griddle made by following the method steps as depicted in FIGS. 1 and 2.

FIG. 4 is a diagram showing the first step in forming a frying pan, i.e., showing an aluminum foil means in overlying relation to one end of a suitable mold means, e.g., a number 10 can.

FIG. 5 depicts diagrammatically the second step in forming a frying pan.

FIG. 6 depicts diagrammatically the third step in forming a frying pan.

FIG. 7 is a diagrammatic perspective view of a frying pan made by following the steps depicted in FIGS. 4-6.

FIG. 8 is a diagram showing the first step in forming a sauce pan, i.e., showing an aluminum foil means in overlying relation to the closed end of a suitable mold means, e.g., a mayonnaise jar.

FIG. 9 depicts diagrammatically the second step in forming a sauce pan.

FIG. 10 depicts diagrammatically the third step in forming a sauce pan.

FIG. 11 is a diagrammatic perspective view of a sauce pan made by following the steps depicted in FIGS. 8-10.

FIG. 12 is a diagram showing the inventive frame for a spoon in overlying relation to an aluminum foil means.

FIG. 13 is a diagrammatic perspective view of the spoon made by crimpingly attaching the foil means of FIG. 11 to the periphery of the frame so that a depressed web portion is provided to serve as the operative portion of the spoon.

Similar reference characters refer to similar parts throughout the several views of the drawings.

DETAILED DESCRIPTION OF THE PREFERRED EMBODIMENT

A method for hand forming a two dimensional cooking utensil such as a griddle will first be disclosed.

FIG. 1 shows a wire member generally designated 10 that has been bent so that its substantially parallel coplanar transversely opposed, opposing ends collectively designated 12, defines a handle means extending radially from its intermediate portion 14 that has been bent into a substantially perfect circle.

The bending of the wire means 10 by hand need be performed only once, since the wire means 10, once formed in the manner just described, can be retained indefinitely.

A predetermined length of sheet material such as an aluminum foil-type means 16 of the type commercially available and packaged in a rolled configuration is then separated from its roll and laid flat on a support surface (not shown) so that its reflective side abuts the support surface, i.e., so that its non-reflective side is visible in top plan view, as in FIG. 1.

The circular portion 14 of the wire-like member 10 is then disposed substantially certrally in overlying relationship with the foil means 16 in the manner depicted in FIG. 1. It will thus be seen that the innermost or web portion 18 of the foil means 16 is surrounded, in plan view, by the intermediate portion 14 of the wire member 10. The peripheral boundaries 20 of the foil means 16 and the portion 22 of the foil means 16 adjacent said peripheral boundaries 20 lies outwardly of the intermediate or web prtion 18 of the wire means 10, as seen in plan view.

The outermost portion 22 of the foil means 16 is then manually folded radially inwardly (FIG. 2) to wrappingly engage different areas of the intermediate portion 14 of the wire member 10, and a crimping means (not shown) is used to enhance the engagement of the wiremember 10 and the foil means 16. One's finger and thumb can adequately serve as the crimping means.

A non-heat conducting handle means 24 is then attached in covering relation to the handle portion 12 of the wire member 10 so that the griddle 26 (FIG. 3) formed by following the inventive method can be employed as a griddle means during a cooking operation without conducting heat to the hand of the person using the uniquely formed apparatus.

A three-dimensional cooking utensil such as a frying pan can be formed by a method somewhat similar to the just described method for forming two dimensional objects.

In this method, the wire-like means formed in the course of the first method can be employed. Since convenient quantities of food are often supplied in cans known commercially known as number 10 cans, such cans, designated 28 in FIG. 4, can be used to form the wire member 10 into a circular configuration with integral handle means 12 extending radially therefrom as earlier described.

A number 10 can 28 not only serves to define the specific configuration of the circular portion 14 of the wire means 10, but also serves as the mold for the desired three-dimensional frying pan. A suitable predetermined portion of the foil means 16 is manually folded against different areas of the can 28 as depicted in FIGS. 4 and 5. The wire member 10 and the can 28 are placed in mutually concentric alignment so that the wire member 10 may be lowered over the foil-covered end of the can 28, i.e., the foil-covered end of the can 28 is caused to protrude through the loop defined by the wire member 10. The extent of lowering or protrusion, i.e., the extent of the relative converging axial displacement between the can 28 and the wire member 10 determines the depth of the frying pan to be formed. Having positioned the wire member 10 in the position depicted in FIG. 6, the free ends of the foil means 16 are then reversely folded to wrappingly engage the wire member 10 at different areas. A crimping means (not shown) is then employed as before and the foil/wire member assembly is removed from the mold, i.e., from the can 28 and the frying pan 30, shown in FIG. 7, is ready for use. Clearly, the only portion of the cooking utensils formed by the inventive method that need ever be discarded is the foil portion 16, due to the eventual deleterious effect of heat acting thereon and due to the difficulty in cleaning such foil 16 for subsequent re-use.

Another item commonly needed by campers or others not owning permanent cookware is the sauce pan 32, the formation of which is shown in FIGS. 8 through 11. Typical sauce pans are approximately 2″ deep and can be conveniently made by following the steps described in hand forming a frying pan, with the exception of selecting a standard mayonnaise jar 34 as the mold both for the wire member 10 and the foil means 16.

FIGS. 12 and 13 depicts the forming of a three dimension spoon 36. No mold need be employed to conform the wire member 10 into the configuration of a spoon 36 as shown in FIG. 13. A quantity of foil means 16 greater than that amount needed to form a two dimensional object is separated from the commercially available rolled foil package (not shown) so that the excess amount can be formed into a depression 38 that comprises the operative portion of the spoon 36, i.e., the excess amount of foil represents the slack provided in the web portions 3 intermediate the wire member 14 to allow the web portion 38 to be conformed three-dimensionally as desired.

It should now be apparent that a virtually unlimited quantity of two-dimensional and three dimensional cooking utensils can be formed by following the teachings of this invention. For example, a spatula, casserole dishes, coffee pots, and similar items can now be hand made by following the teachings and suggestions of this invention.

It will thus be seen that the objects set forth above, and those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described,

What is claimed is:

1. A method of hand-forming three dimensional cooking utensils such as frying pans, sauce pans and the like, comprising the steps of:
   (a) procuring a substantially rigid, generally cylindrical, three dimensional object to serve as a mold, said object having the dimensions and configuration of the desired utensil, and positioning said object in upstanding configuration on a support surface, (b) wrapping the medial portion of a predetermined length of a wire-like member about the cylindrical walls of said object so that said medial portion conforms to the shape of said walls, (c) bending the opposed ends of said wire-like member so that said ends extend radially from said medial portion of said wire-like member and so that said ends are disposed in substantially parallel relation to one another, so that said opposed ends collectively provide a handle means for said utensil, (d) procuring a predetermined quantity of aluminum-type foil means sufficient to cover the uppermost free end and the cylindrical sidewalls of said object, (e) conforming said foil means to the shape of said object by manipulating said foil means by hand, (f) protruding said object with the formed foil thereon through the wire-like member conformed to the shape of the object, (g) reversely folding the peripheral edges of the foil means to wrappingly engage the wire-like member to said foil means, thereby forming a wire-like member/foil means assembly, (h) separating said assembly from said object, and (i) discarding said foil means only after sufficient use thereof and retaining said wire-like member and said object to facilitate the hand-forming of additional utensils as required.

2. The methods of claim 1, further comprising the step of covering the radially extending handle portions of said respective utensils with a substantially non-heat conducting material.

* * * * *